United States Patent
Isobe et al.

(10) Patent No.: US 9,481,783 B2
(45) Date of Patent: Nov. 1, 2016

(54) RUBBER COMPOSITION FOR TIRES AND PNEUMATIC TIRE

(75) Inventors: Yukio Isobe, Kobe (JP); Takao Wada, Kobe (JP); Takayuki Hattori, Kobe (JP); Naoya Ichikawa, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/415,501

(22) PCT Filed: Aug. 2, 2012

(86) PCT No.: PCT/JP2012/069690
§ 371 (c)(1),
(2), (4) Date: Jan. 16, 2015

(87) PCT Pub. No.: WO2014/020740
PCT Pub. Date: Feb. 6, 2014

(65) Prior Publication Data
US 2015/0175781 A1    Jun. 25, 2015

(51) Int. Cl.
*C08F 8/00* (2006.01)
*C08F 36/00* (2006.01)
*C08L 7/00* (2006.01)
*B60C 1/00* (2006.01)
*C08L 21/00* (2006.01)
*C08K 5/3477* (2006.01)

(52) U.S. Cl.
CPC . *C08L 7/00* (2013.01); *B60C 1/00* (2013.01); *C08L 21/00* (2013.01); *B60C 2001/0058* (2013.04); *C08K 5/3477* (2013.01)

(58) Field of Classification Search
CPC . B60C 1/00; B60C 15/06; B60C 2001/0058; C08L 21/00; C08L 7/00; C08L 15/00; C08L 61/06; C08K 5/3477
USPC ........................................... 525/152; 526/335
See application file for complete search history.

(56) References Cited

U.S. PATENT DOCUMENTS

| | | | | | |
|---|---|---|---|---|---|
| 2,853,470 A | * | 9/1958 | Rosamilia | ................ | C08G 6/02 525/154 |
| 4,324,710 A | * | 4/1982 | Davis | ........................ | C08L 7/00 152/450 |
| 2006/0094831 A1 | | 5/2006 | Choi et al. | | |
| 2009/0151844 A1 | | 6/2009 | Miyazaki | | |
| 2010/0130663 A1 | * | 5/2010 | Taguchi | ................ | B60C 1/0008 524/432 |
| 2010/0256258 A1 | | 10/2010 | Miyazaki | | |
| 2012/0184658 A1 | | 7/2012 | Miyazaki | | |

FOREIGN PATENT DOCUMENTS

| | | | |
|---|---|---|---|
| EP | 2 009 049 A1 | | 12/2008 |
| JP | 2005-68240 A | | 3/2005 |
| JP | 2006-342262 A | | 12/2006 |
| JP | 2007-302865 A | | 11/2007 |
| JP | 2008-38140 A | | 2/2008 |
| JP | 2008-156417 A | | 7/2008 |
| JP | 2008-156419 A | | 7/2008 |
| JP | 2008-285626 A | | 11/2008 |
| JP | 2009-127041 A | | 6/2009 |
| JP | 2009-155637 A | | 7/2009 |
| JP | 2010-144038 A | | 7/2010 |
| JP | 2011-1463 A | | 1/2011 |
| JP | 2011-195804 A | | 10/2011 |
| JP | 2012-067201 | * | 4/2012 |
| JP | 2012-97280 A | | 5/2012 |
| WO | WO 2005/035647 A1 | | 4/2005 |
| WO | WO 2009/072560 A1 | | 6/2009 |

OTHER PUBLICATIONS

English machine translation of Japanese Patent No. 2006-342262-A, dated Dec. 21, 2006.
English machine translation of Japanese Patent No. 2009-127041-A, dated Jun. 11, 2009.
International Search Report issued in PCT/JP2012/069690, mailed on Aug. 28, 2012.

* cited by examiner

*Primary Examiner* — William Cheung
(74) *Attorney, Agent, or Firm* — Birch, Stewart, Kolasch & Birch, LLP

(57) ABSTRACT

The present invention provides rubber compositions for tires which are capable of improving handling stability, fuel efficiency, and processability while sufficiently reducing the dependence on petroleum resources, and pneumatic tires including tire components (e.g. bead apex) formed from the rubber compositions for tires. The present invention relates to rubber compositions for tires, containing a rubber component and a naturally derived phenolic resin.

14 Claims, No Drawings

RUBBER COMPOSITION FOR TIRES AND PNEUMATIC TIRE

TECHNICAL FIELD

This patent application is a U.S. national stage application under 35 U.S.C. Section 371 of International Patent Application No. PCT/JP2012/069690 filed on Aug. 2, 2012.

BACKGROUND ART

The recent growing concerns about environmental issues have led to studies on methods of reducing the use of materials derived from petroleum resources in various technical fields. Tires commercially available today contain, for example, about 20% by mass of synthetic rubber, about 20% by mass of carbon black, and other materials such as a softener and synthetic fibers, which means that they contain at least about 50% of petroleum-derived materials as a whole. Thus, reducing the dependence on petroleum-derived materials and improving the fuel efficiency of tires are both considered to be important environmental technologies to be developed in tires.

Meanwhile, improvements in the performance of cars are requiring tires to have high handling stability. In order to obtain tires with high handling stability, the hardness of the bead apex rubber needs to be increased. However, if a large amount of reinforcing filler (e.g. carbon black) is added to increase the hardness of the bead apex rubber, then problems of deterioration of processability and fuel efficiency appear. To solve these problems, rubber compositions for bead apexes containing additives such as phenolic resin have been developed.

Patent Literatures 1 and 2 disclose rubber compositions containing a thermosetting phenolic resin or a lignophenol derivative as a rubber reinforcing ingredient, as well as pneumatic tires formed from the rubber compositions. However, a part of the materials for the synthesis of the thermosetting phenolic resin of Patent Literature 1 and of the lignophenol derivative of Patent Literature 2 are petroleum-derived materials. Hence, these rubber compositions still have room for improvement in terms of the dependence on petroleum resources.

It is also described that the lignophenol derivative of Patent Literature 2 improves handling stability without an increase in rolling resistance by enhancing E* (complex elastic modulus) while keeping tan δ (loss tangent) at about 70° C. low. Still, the hardness and the handling stability of the resulting rubber are considerably low compared to general-purpose thermosetting phenolic resins. Thus, the lignophenol derivative is not considered to be sufficiently effective in increasing the hardness and rigidity of the rubber.

As described above, the conventional techniques still have room for improvement in terms of improving handling stability and the fuel efficiency while sufficiently reducing the dependence on petroleum resources.

CITATION LIST

Patent Literature

Patent Literature 1: JP 2005-68240 A
Patent Literature 2: JP 2008-285626 A

SUMMARY OF INVENTION

Technical Problem

An object of the present invention is to solve the above problems by providing rubber compositions for tires which are capable of improving handling stability, fuel efficiency, and processability while sufficiently reducing the dependence on petroleum resources, and pneumatic tires including tire components (e.g. bead apex) formed from the above rubber compositions.

Solution to Problem

The present invention relates to a rubber composition for tires, containing a rubber component, and a naturally derived phenolic resin.

The phenolic resin is preferably derived from a plant-derived phenol and an aldehyde.

The rubber component preferably includes at least one selected from the group consisting of natural rubber, modified natural rubber, synthetic rubber, and modified synthetic rubber.

The rubber composition preferably contains 1 to 100 parts by mass of the phenolic resin for each 100 parts by mass of the rubber component.

The rubber composition for tires preferably contains a curing accelerating catalyst.

The curing accelerating catalyst is preferably hexamethylenetetramine.

The rubber composition for tires is preferably used as a rubber composition for bead apexes.

The present invention also relates to a pneumatic tire formed from the above rubber composition.

Advantageous Effects of Invention

Since the present invention relates to rubber compositions for tires containing a rubber component and a naturally derived phenolic resin, they are capable of improving handling stability, fuel efficiency, and processability while sufficiently reducing the dependence on petroleum resources. Thus, the use of these rubber compositions in tire components (e.g. bead apex) provides tires that exhibit excellent handling stability and excellent fuel efficiency with a sufficiently reduced dependence on petroleum resources.

DESCRIPTION OF EMBODIMENTS

The rubber compositions for tires according to the present invention contain a rubber component and a naturally derived phenolic resin.

The present invention uses a naturally derived phenolic resin in place of conventional phenolic resins derived from materials including petroleum-derived materials. This use makes it possible to not only reduce the use of petroleum-derived materials but also to provide rubber compositions with high rigidity (hardness), low heat build-up, and excellent processability. Then, using such rubber compositions in tire components (e.g. bead apex), pneumatic tires can be provided which exhibit excellent handling stability and excellent fuel efficiency with a sufficiently reduced dependence on petroleum resources.

The rubber component preferably includes at least one selected from the group consisting of natural rubber (NR), modified natural rubber, synthetic rubber, and modified synthetic rubber.

Examples of the modified natural rubber include epoxidized natural rubber (ENR), hydrogenated natural rubber, and deproteinized natural rubber.

Examples of the synthetic rubber include diene rubbers such as polybutadiene rubber (BR), styrene-butadiene copolymer rubber (SBR), polyisoprene rubber (IR), butyl rubber (IIR), acrylonitrile-butadiene rubber (NBR), acrylonitrile-styrene-butadiene copolymer rubber, chloroprene rubber, styrene-isoprene copolymer rubber, styrene-isoprene-butadiene copolymer rubber, isoprene-butadiene copolymer rubber, and chlorosulfonated polyethylene; ethylene-propylene copolymer rubber, acrylic rubber, epichlorohydrin rubber, polysulfide rubber, silicone rubber, fluororubber, and urethane rubber.

Examples of the modified synthetic rubber include rubbers obtained by terminally modifying the above synthetic rubbers with organosilicon compounds or the like.

These rubbers may be used alone or as a blend of two or more. In the case of using them as a blend, the blending ratio may be appropriately determined according to the particular application. In particular, in view of improving handling stability, fuel efficiency, and processability while reducing the dependence on petroleum resources, NR, ENR, hydrogenated natural rubber, deproteinized natural rubber, and BR synthesized from materials other than petroleum resources are preferred.

The combined amount of NR and modified natural rubber based on 100% by mass of the rubber component is preferably 60% by mass or more, more preferably 80% by mass or more, and still more preferably 100%. If the combined amount is less than 60% by mass, the dependence on petroleum resources may not sufficiently reduced. Additionally, handling stability, fuel efficiency, and processability may not be sufficiently improved.

The present invention uses a naturally derived phenolic resin (hereinafter, also referred to simply as phenolic resin). Whether or not a phenolic resin is naturally derived can be determined by, for example, the method of quantifying the amount of C14 (ASTM-D6866).

The naturally derived phenolic resin refers to a phenolic resin (solid resole phenolic resin) obtainable by reacting a plant-derived phenol and an aldehyde in the presence of a basic catalyst. The phenolic resin may also be modified with compounds, such as cashew oil, tall oil, linseed oil, various animal and plant oils, or rosin. These may be used alone or in combination of two or more.

Examples of the plant-derived phenols include cashew nut shell liquid (CNSL), cashew oil, cardanol, and urushiol. These may be used alone or in combination of two or more. In particular, cardanol is preferred because it contains a small amount of impurities and is easily available.

Examples of the aldehydes include plant-derived aldehydes, non-plant-derived aldehydes, and mixtures of them.

Examples of the plant-derived aldehydes include furfurals such as furfural, 5-methylfurfural, and hydroxymethylfurfural. These may be used alone or in combination of two or more.

Examples of the non-plant-derived aldehydes include formaldehyde, paraformaldehyde, acetaldehyde, benzaldehyde, and salicylaldehyde. These may be used alone or in combination of two or more.

In the preparation of the phenolic resin, the mass ratio of phenol to aldehyde is preferably 1 to 20:1, and more preferably 1.5 to 6:1 (phenol:aldehyde). When at least a 1-fold amount of phenol is used, gelation can be suppressed, while when at most a 20-fold amount of phenol is used, the reaction rate can be increased to increase molecular weight and render the product solid.

In the reaction between a phenol and an aldehyde, a basic catalyst is used. Examples of the basic catalysts include hydroxides of alkali metals or alkaline earth metals (e.g., sodium hydroxide, calcium hydroxide, barium hydroxide, lithium hydroxide), and amines (e.g. ammonium hydroxide, diethylamine, triethylamine, triethanolamine, ethylenediamine, hexamethylenetetramine). These may be used alone or in combination of two or more.

The amount of the basic catalyst used relative to the combined mass of the phenol and the aldehyde is preferably 0.1 to 50% by mass, and more preferably 0.5 to 5% by mass. The use of 0.1% by mass or more of basic catalyst allows the reaction to sufficiently proceed, while the use of 50% by mass or less of basic catalyst can suppress gelation.

The reaction conditions may be the same as when common solid resole phenolic resins are prepared.

The softening point of the phenolic resin is preferably 60° C. or higher, and more preferably 80° C. or higher. The phenolic resin with a softening point lower than 60° C. tends to cause blocking during storage, bringing difficulties in handling. The softening point is also preferably 120° C. or lower, and more preferably 100° C. or lower. The phenolic resin with a softening point higher than 120° C. tends to have significantly poor kneadability into rubber. The softening point values herein are measured in accordance with JIS K 2207. When the softening point of the phenolic resin falls within the temperature range mentioned above, the effect of the present invention can more suitably be achieved.

The amount of the phenolic resin for each 100 parts by mass of the rubber component is preferably 1 part by mass or more, more preferably 5 parts by mass or more, and still more preferably 10 parts by mass or more. Less than 1 part by mass of phenolic resin may not sufficiently improve handling stability, fuel efficiency, and processability. The amount of the phenolic resin is also preferably 100 parts by mass or less, more preferably 50 parts by mass or less, and still more preferably 25 parts by mass or less. More than 100 parts by mass of phenolic resin may deteriorate processability and excessively increase hardness.

The rubber compositions of the present invention preferably contain a curing accelerating catalyst. The use of a curing accelerating catalyst accelerates curing of the phenolic resin, favorably contributing to the effect of the present invention.

The curing accelerating catalyst may be any catalyst capable of curing the phenolic resin in the vulcanization step. Examples thereof include hexamethylenetetramine, melamine, methylolmelamine, hexamethoxymethylolmelamine, hexamethoxymethylol pantamethyl ether, alkaline carbonates (e.g. calcium carbonate, sodium carbonate), alkaline hydrogencarbonates (e.g. sodium hydrogencarbonate), and acids (e.g. stearic acid, hydroxystearic acid, oxalic acid, citric acid, carbonic acid) and various metal salts thereof. In particular, hexamethylenetetramine is preferred because it is more effective in increasing the hardness of the phenolic resin.

The amount of the curing accelerating catalyst is preferably 1 part by mass or more, more preferably 5 parts by mass or more, and still more preferably 7 parts by mass or more, for each 100 parts by mass of the phenolic resin. Less than 1 part by mass of curing accelerating catalyst may not sufficiently cure the phenolic resin. The amount of the curing accelerating catalyst is preferably 50 parts by mass or less, more preferably 30 parts by mass or less, and still more preferably 15 parts by mass or less, for each 100 parts by mass of the phenolic resin. More than 50 parts by mass of curing accelerating catalyst may cause non-uniform curing of the phenolic resin.

The rubber compositions of the present invention preferably contain silica. The use of silica provides good fuel efficiency, high rubber strength, and high handling stability. Examples of the silica include, but not limited to, dry silica (anhydrous silica) and wet silica (hydrous silica). Wet silica is preferred because it has a large number of silanol groups and also has good processability.

The nitrogen adsorption specific surface area ($N_2SA$) of silica is preferably 30 $m^2/g$ or larger, more preferably 100 $m^2/g$ or larger, and still more preferably 150 $m^2/g$ or larger. Silica with an $N_2SA$ of smaller than 30 $m^2/g$ may produce a small reinforcing effect, failing to sufficiently improve rubber strength and handling stability. The $N_2SA$ of silica is also preferably 500 $m^2/g$ or smaller, more preferably 250 $m^2/g$ or smaller, and still more preferably 200 $m^2/g$ or smaller. Silica with an $N_2SA$ of larger than 500 $m^2/g$ tends to have lowered dispersibility, resulting in reductions in low heat build-up properties and processability.

Here, the nitrogen adsorption specific surface area values of silicas are determined by the BET method in accordance with ASTM D3037-81.

The amount of silica for each 100 parts by mass of the rubber component is preferably 5 parts by mass or more, more preferably 20 parts by mass or more, and still more preferably 35 parts by mass or more. The use of less than 5 parts by mass of silica tends not to sufficiently exhibit its effect. The amount of silica is preferably 150 parts by mass or less, more preferably 120 parts by mass or less, and still more preferably 60 parts by mass or less. More than 150 parts by mass of silica tends to be difficult to disperse in rubber, resulting in reduced processability.

The rubber compositions preferably contain a silane coupling agent together with silica.

The silane coupling agent may be any silane coupling agent conventionally used with silica in the rubber industry. Examples thereof include sulfide silane coupling agents, such as bis(3-triethoxysilylpropyl)disulfide or bis(3-triethoxysilylpropyl)tetrasulfide; mercapto silane coupling agents, such as 3-mercaptopropyltrimethoxysilane; vinyl silane coupling agents, such as vinyltriethoxysilane; amino silane coupling agents, such as 3-aminopropyltriethoxysilane; glycidoxy silane coupling agents, such as γ-glycidoxypropyltriethoxysilane; nitro silane coupling agents, such as 3-nitropropyltrimethoxysilane; and chloro silane coupling agents, such as 3-chloropropyltrimethoxysilane. In particular, sulfide silane coupling agents are preferred, and bis(3-triethoxysilylpropyl)tetrasulfide is more preferred.

The rubber compositions of the present invention may appropriately contain compounding agents generally used in the preparation of rubber compositions as well as the above components, such as reinforcing fillers (e.g. carbon black, clay), zinc oxide, stearic acid, various antioxidants, softeners (e.g. oil), wax, vulcanizing agents (e.g. sulfur), and vulcanization accelerators.

The amount of zinc oxide for each 100 parts by mass of the rubber component is preferably 1.5 parts by mass or more, more preferably 2 parts by mass or more, and still more preferably 4 parts by mass or more. The use of less than 1.5 parts by mass of zinc oxide tends to allow the cure reaction to insufficiently proceed, making it difficult to provide high rubber strength, high handling stability, and good fuel efficiency. The amount of zinc oxide is preferably 20 parts by mass or less, and more preferably 10 parts by mass or less. The use of more than 20 parts by mass of zinc oxide may unnecessarily increase the cost and may result in poor dispersion of zinc oxide, reducing physical properties.

The rubber compositions of the present invention may be prepared by known methods, such as for example by kneading the above components with a rubber kneading machine, such as an open roll mill or a Banbury mixer, and then vulcanizing the kneaded mixture.

The rubber compositions of the present invention can suitably be used in tire components (e.g. bead apex). The bead apex refers to a component placed between the folded portions of the carcass and extending towards the sidewall of a tire. Specifically, it is a component illustrated in, for example, FIG. 1 of JP 2009-001681 A.

The pneumatic tires of the present invention may be prepared using the above rubber compositions by usual methods. Specifically, the rubber composition before vulcanization is extruded according to the shape of a tire component (e.g. bead apex), formed by a usual method on a tire building machine and assembled with the other tire components to build an unvulcanized tire, which is then pressurized under heat in a vulcanizer to form a tire.

EXAMPLES

Hereinafter, the present invention will be described in more detail by reference to examples which, however, are not intended to limit the scope of the present invention.

The chemical agents used in the examples and comparative examples are listed below.

Natural rubber: RSS#3 (Teck Bee Hang Co., Ltd.)

Phenolic resin 1: product of Gunei Chemical Industry Co., Ltd. (softening point: 85° C., plant-derived phenol: cashew oil, plant-derived aldehyde: furfural, amount of plant-derived aldehyde: 100% by mass (per 100% by mass of total aldehyde), degree of dependence on petroleum resources of the resin: 0% by mass)

Phenolic resin 2: product of Gunei Chemical Industry Co., Ltd. (softening point: 80° C., plant-derived phenol: cashew oil, plant-derived aldehyde: furfural, amount of plant-derived aldehyde: 80% by mass (per 100% by mass of total aldehyde), degree of dependence on petroleum resources of the resin: 0% by mass)

Phenolic resin 3: product of Gunei Chemical Industry Co., Ltd. (softening point: 86° C., plant-derived phenol: cardanol, plant-derived aldehyde: furfural, amount of plant-derived aldehyde: 90% by mass (per 100% by mass of total aldehyde), degree of dependence on petroleum resources of the resin: 0% by mass)

Phenolic resin 4: product of Gunei Chemical Industry Co., Ltd. (softening point: 90° C., plant-derived phenol: cardanol, plant-derived aldehyde: furfural, amount of plant-derived aldehyde: 100% by mass (per 100% by mass of total aldehyde), degree of dependence on petroleum resources of the resin: 0% by mass)

Phenolic resin 5: PR12686 (Sumitomo Bakelite Co., Ltd., cashew oil-modified phenolic resin, melting point: 75° C.)

Silica: Ultrasil VN3 (Degussa, $N_2SA$: 175 $m^2/g$)

Silane coupling agent: Si69 (Degussa, bis(3-triethoxysilylpropyl)tetrasulfide)

Stearic acid: stearic acid (beads), Tsubaki (NOF Corporation)

Zinc oxide: zinc oxide #2 (Mitsui Mining and Smelting Co., Ltd.)

Sulfur: powdered sulfur (Tsurumi Chemical Industry Co., Ltd.)

Vulcanization accelerator: NOCCELER NS (Ouchi Shinko Chemical Industrial Co., Ltd.)

Hexamethylenetetramine: NOCCELER H (Ouchi Shinko Chemical Industrial Co., Ltd.)

Examples 1 to 4 and Comparative Examples 1 and 2

In accordance with each formulation shown in Table 1, a 1.7-L Banbury mixer (KOBE STEEL, LTD.) was charged with compounding agents other than sulfur, vulcanization accelerator, and hexamethylenetetramine so that the fill factor was 60%, and then they were kneaded for 3 minutes at a number of revolutions of 80 rpm until the temperature reached 150° C. To the kneaded mixture were added the sulfur, vulcanization accelerator, and hexamethylenetetramine in formulation amounts shown in Table 1. Then the mixture was kneaded at 80° C. for 5 minutes with an open roll mill to prepare an unvulcanized rubber composition. The prepared unvulcanized rubber composition was press-vulcanized for 12 minutes at 170° C. to prepare a vulcanized rubber composition.

Separately, the obtained unvulcanized rubber composition was formed into the shape of a bead apex, and press-vulcanized for 12 minutes at 170° C. together with the other tire components, whereby a tire for passenger cars (size: 195/65R15) was prepared.

The following evaluations were performed on the thus-obtained unvulcanized rubber compositions, vulcanized rubber compositions, and tires for passenger cars. The results are shown in Table 1.

(Mooney Viscosity)

The Mooney viscosity ($ML_{1+4}$) of the unvulcanized rubber compositions (curable rubber formulations) was measured at a temperature of 130° C. using an L-shaped rotor in accordance with JIS K 6300 "Rubber, unvulcanized—Physical property—Part 1: Determination of Mooney viscosity and pre-vulcanization characteristics with Mooney viscometer". Then Mooney viscosity indices were calculated using the following calculation equation:

(Mooney viscosity index)=(Mooney viscosity of each formulation)/(Mooney viscosity of Comparative Example 1)×100.

A lower Mooney viscosity index indicates a lower viscosity of the unvulcanized rubber composition and thus better processability.

(Hardness Test)

Rubber hardness was measured using a Type A durometer in accordance with JIS K6253 "Rubber, vulcanized or thermoplastic—Determination of hardness". Then rubber hardness indices were calculated using the following calculation equation:

(Rubber hardness index)=(rubber hardness of each formulation)/(rubber hardness of Comparative Example 1)×100.

A higher rubber hardness index indicates that the rubber has a higher rigidity and is better reinforced, and thus when used in pneumatic tires, it provides good handling stability.

(Viscoelasticity Test)

The loss tangent (tan δ) at 70° C. of the vulcanized rubber compositions was measured using a viscoelasticity spectrometer VES (Iwamoto Seisakusho Co., Ltd.) at an initial strain of 10% and a dynamic strain of 2%. Then loss tangent indices were calculated using the following calculation equation:

(Loss tangent index)=(tan δ of each formulation)/(tan δ of Comparative Example 1)×100.

A lower loss tangent index indicates that the vulcanized rubber composition has lower heat build-up, and thus when used in pneumatic tires, it provides good rolling resistance properties.

(Handling Stability)

Each set of prepared tires for passenger cars were mounted on a passenger car (Noah from TOYOTA MOTOR CORPORATION). The passenger car was driven on a test track to perform sensory evaluation for handling stability and steering response. With the degrees of handling stability and steering response of Comparative Example 1 being set equal to 5 (standard), the handling stability and the steering response of the other example tires are then rated on a six-point scale; a higher point indicates better handling stability and better steering response, and "5+" is better than 5 but poorer than 6.

(Rolling Resistance)

The rolling resistance of the prepared tires for passenger cars was measured with a rolling resistance testing machine (KOBE STEEL, LTD.) by running the tires with an internal pressure of 200 kPa at a load of 30 N and a velocity of 80 km/h. Then the percentage (%) of change in rolling resistance from Comparative Example 1 (standard (0)) was calculated for each formulation example using the calculation equation below and expressed as an index. Lower percentages of change in rolling resistance indicate lower rolling resistance which is preferred. More specifically, the percentage of change in rolling resistance is preferably negative.

(Percentage of change in rolling resistance)=[(rolling resistance of each formulation)−(rolling resistance of Comparative Example 1)]/(rolling resistance of Comparative Example 1)×100

TABLE 1

|  |  | Example 1 | Example 2 | Example 3 | Example 4 | Comparative Example 1 | Comparative Example 2 |
|---|---|---|---|---|---|---|---|
| Formulation (parts by mass) | Natural rubber | 100 | 100 | 100 | 100 | 100 | 100 |
|  | Phenolic resin 1 | 15 | — | — | — | — | — |
|  | Phenolic resin 2 | — | 15 | — | — | — | — |
|  | Phenolic resin 3 | — | — | 15 | — | — | — |
|  | Phenolic resin 4 | — | — | — | 15 | — | — |
|  | Phenolic resin 5 | — | — | — | — | 7.5 | 15 |
|  | Silica | 45 | 45 | 45 | 45 | 45 | 45 |
|  | Silane coupling agent | 4.5 | 4.5 | 4.5 | 4.5 | 4.5 | 4.5 |
|  | Stearic acid | 3 | 3 | 3 | 3 | 3 | 3 |
|  | Zinc oxide | 5 | 5 | 5 | 5 | 5 | 5 |
|  | Sulfur | 3 | 3 | 3 | 3 | 3 | 3 |
|  | Vulcanization accelerator | 2 | 2 | 2 | 2 | 2 | 2 |
|  | Hexamethylenetetramine | 1.5 | 1.5 | 1.5 | 1.5 | 0.75 | 1.5 |

TABLE 1-continued

|  |  | Example 1 | Example 2 | Example 3 | Example 4 | Comparative Example 1 | Comparative Example 2 |
|---|---|---|---|---|---|---|---|
| Property evaluation | Mooney viscosity index | 84 | 72 | 73 | 71 | 100 | 97 |
|  | Rubber hardness index | 108 | 104 | 105 | 106 | 100 | 105 |
|  | Loss tangent index | 90 | 89 | 94 | 91 | 100 | 127 |
|  | Handling stability | 6 | 5+ | 5+ | 6 | 5 | 5+ |
|  | Percentage of change in rolling resistance | −1.5 | −1.7 | −0.9 | −1.4 | 0 | 2.1 |

In the examples in which naturally derived phenolic resins (phenolic resins 1 to 4) were used, handling stability, fuel efficiency, and processability were improved. Further, since the phenolic resins 1 to 4 were each prepared from a plant-derived phenol and an aldehyde, the rubber compositions (pneumatic tires) had a reduced dependence on petroleum resources and an increased percentage of biomass.

The invention claimed is:

1. A pneumatic tire, formed from a rubber composition, comprising:
   a rubber component, and
   a naturally derived phenolic resin,
wherein the phenolic resin is derived from a plant-derived phenol and an aldehyde one or more furfurals.

2. The pneumatic tire according to claim 1, wherein the rubber component includes at least one selected from the group consisting of natural rubber, modified natural rubber, synthetic rubber, and modified synthetic rubber.

3. The pneumatic tire according to claim 1, wherein the rubber composition comprises 1 to 100 parts by mass of the phenolic resin for each 100 parts by mass of the rubber component.

4. The pneumatic tire according to claim 1, wherein the rubber composition further comprises a curing acceleration catalyst.

5. The pneumatic tire according to claim 4, wherein the curing acceleration catalyst is hexamethylenetetramine.

6. A pneumatic tire comprising bead apexes formed from a rubber composition comprising:
   a rubber component, and
   a naturally derived phenolic resin,
wherein the phenolic resin is derived from a plant-derived phenol and an aldehyde one or more furfurals.

7. The pneumatic tire according to claim 1, wherein the phenolic resin is obtained by reacting a plant-derived phenol, one or more furfurals and a basic catalyst.

8. The pneumatic tire according to claim 7, wherein the rubber composition comprises 10 to 100 parts by mass of the phenolic resin for each 100 parts by mass of the rubber component.

9. The pneumatic tire according to claim 8, wherein the mass ratio of phenol to the one or more furfurals is 1 to 20:1 in forming the phenol resin.

10. The pneumatic tire according to claim 9, wherein the rubber composition comprises 10 to 50 parts by mass of the phenolic resin for each 100 parts by mass of the rubber component.

11. The pneumatic tire according to claim 10, wherein the mass ratio of phenol to the one or more furfurals is 1.5 to 6:1 in forming the phenol resin.

12. The pneumatic tire according to claim 10 having bead apexes that are formed from the rubber composition.

13. The pneumatic tire according to claim 9, wherein the phenol is selected from the group consisting of cashew nut shell liquid, cashew oil, cardanol, urushiol and combinations thereof.

14. The pneumatic tire according to claim 9, wherein the phenol is cardanol.

* * * * *